US006575677B2

(12) United States Patent
Craft

(10) Patent No.: US 6,575,677 B2
(45) Date of Patent: Jun. 10, 2003

(54) WHEELCHAIR RESTRAINT METHOD FOR A TRANSPORTATION VEHICLE

(76) Inventor: Richard D. Craft, P.O. Box 354, Marshallville, GA (US) 31057

( * ) Notice: Subject to any disclaimer, the term of this patent is extended or adjusted under 35 U.S.C. 154(b) by 0 days.

(21) Appl. No.: 10/115,464

(22) Filed: Apr. 3, 2002

(65) Prior Publication Data

US 2002/0114679 A1 Aug. 22, 2002

Related U.S. Application Data

(62) Division of application No. 09/742,634, filed on Dec. 21, 2000, now Pat. No. 6,428,254, which is a continuation of application No. 09/390,569, filed on Sep. 3, 1999, now abandoned, which is a continuation of application No. 08/939,155, filed on Sep. 29, 1997, now Pat. No. 6,113,325.

(51) Int. Cl.[7] .................... B60P 7/08

(52) U.S. Cl. .................... 410/7; 410/3; 410/4; 410/18; 410/23

(58) Field of Search .................... 410/3, 4, 7, 9, 410/10, 11, 12, 18, 19, 21, 22, 23, 51; 296/65.04; 297/DIG. 4; 280/304.1; 248/503.1

(56) References Cited

U.S. PATENT DOCUMENTS 4,093,303 A * 6/1978 Nelson
4,103,934 A * 8/1978 Arnholt et al. ............. 410/7 X
4,623,289 A * 11/1986 Apostolos .................. 410/7
4,886,403 A * 12/1989 Gresham .................. 410/10
4,995,775 A * 2/1991 Gresham .................. 410/10
5,007,118 A * 4/1991 Ebersole
5,888,038 A * 3/1999 Ditch et al. .................. 410/7
6,113,325 A * 9/2000 Craft .................. 410/7
6,231,283 B1 * 5/2001 Stowers .................. 410/9
6,428,254 B2 * 8/2002 Craft .................. 410/7

* cited by examiner

*Primary Examiner*—Stephen T. Gordon
(74) *Attorney, Agent, or Firm*—McNair Law Firm, PA; Cort Flint

(57) ABSTRACT

A wheelchair restraint system for a mass transportation vehicle having a securement area for a wheelchair is disclosed which includes a barrier carried at a rear portion of the securement area disposed generally transverse to the longitudinal vehicle axis. A rear wheelchair attachment assembly is carried by the rear barrier for anchoring the wheelchair to the barrier. A personal securement belt assembly secures a seated wheelchair occupant to the wheelchair in the securement area. A front bulkhead extends generally transverse to the longitudinal vehicle axis at a front portion of the securement area which includes an extendable anchor member which extends transverse relative to the longitudinal vehicle axis. The anchor member is extendable between a stored position in which the anchor member is stowed within the bulkhead and a deployed position wherein the anchor member is extended from the bulkhead. A front wheel chair attachment assembly includes two attachment belts extending from the wheel chair to a first anchor location on the bulkhead and to a second anchor location on the extendable anchor member when the anchor member is in the deployed position. The first and second front attachment belts diverge outwardly and incline downwardly from the wheelchair toward the respective first and second anchor locations on the bulkhead to effectively anchor the occupant and wheelchair and prevent lateral tipping.

7 Claims, 5 Drawing Sheets

WHEELCHAIR RESTRAINT METHOD FOR A TRANSPORTATION VEHICLE

This application is a divisional of application Ser. No. 09/742,634 filed on Dec. 21, 2000, now U.S. Pat. No. 6,428,254 B2; which is a continuation of prior application Ser. No. 09/390,569 filed on Sep. 3, 1999, now abandoned; which is a continuation of Ser. No. 08/939,155 filed on Sep. 29, 1997, which is now U.S. Pat. No. 6,113,325.

BACKGROUND OF THE INVENTION

This invention relates to a wheelchair restraint system for securing a wheelchair and occupant in a mass transportation vehicle such as a bus, train, and the like, and more particularly to a three-point wheelchair restraint system in which the wheelchair is effectively restrained which may be easily stored out of the way when not in use.

Heretofore, wheelchair restraint systems have been utilized on transportation vehicles using various forms of bars, belts, anchors, and clips, and clamps. However, the problem arises that implementation of these systems is often laborious and time consuming. Typically the bus driver must fold a flip seat, remove belts from an underneath storage, anchor the belts in floor slots, and attach the belts to the wheelchair. After the wheelchair occupant is transported, the bus driver must then stop and remove the belts, anchors, and store the belts. Often, the belts are left out and form a hazard for tripping over. Typically the anchor slots and floor wells used to anchor the belt also present trip and fall hazards.

Other securement systems for wheelchairs have been proposed in the prior art such as that disclosed in U.S. Pat. No. 4,103,394 wherein a rear barrier is provided to which a lap belt may be fastened for a wheelchair occupant and a pivotal restraint arm is pivotally attached to the underneath portion of a flip seat which may be pivoted to a cantilevered position in front of the wheelchair occupant to restrain the wheelchair. Other various forms of wheelchair securement systems are disclosed in U.S. Pat. Nos. 5,344,265; 4,455,046; and 4,093,303 using various forms of levers, clamps, bars, straps and the like. However, these systems leave much to be desired in providing a simple restraint system for effectively securing a wheelchair and its occupant wherein the securement system may be readily deployed for use and stored to prevent a hazard to the regular passenger when not in use.

Accordingly, an object of the present invention is to provide a wheelchair restraint system for a transportation vehicle which is easy to deploy yet provides a highly effective securement of the wheelchair.

Another object of the present invention is to provide a wheelchair restraint system which may be rapidly deployed and does not require the presence of structures, intrusive abutments and other hazards in the securement area when the system is not deployed.

Another object of the present invention is to provide a wheelchair restraint system which is restrained by a three-point anchoring system to effectively prevent tipping of a wheelchair and its occupant yet provide rapidly deployable system whose elements may be readily stored when not in use for a nonhazardous securement area.

Yet another object of the invention is to provide a simple wheelchair restraint system using a system of retract-able belt assemblies to secure the wheelchair in a quick and easy manner.

Still another important object of the present invention is to provide a three-point wheelchair restraint system wherein the anchor point structures may be stored out of sight when not in use to provide a safe and easy to use environment.

SUMMARY OF THE INVENTION

The above objectives are accomplished according to the present invention by providing a wheelchair restraint system for a mass transportation vehicle having a securement area for a wheelchair which includes at least one flip seat. The system comprises a barrier carried at a rear portion of the securement area disposed generally transverse to the longitudinal vehicle axis. A rear wheelchair attachment assembly is carried by the rear barrier for anchoring the wheelchair to the barrier. The rear wheelchair attachment assembly has at least two rear attachment elements for attachment at two spaced locations to the wheelchair. A personal securement belt assembly secures a seated wheelchair occupant to the wheelchair in the securement area. A front bulkhead extends generally transverse to the longitudinal vehicle axis at a front portion of the securement area; and a front wheelchair attachment assembly anchors the wheelchair to the bulkhead. The front wheelchair attachment assembly has at least two front attachment elements for attachment to two spaced locations of the wheelchair and the bulkhead. The rear wheelchair attachment assembly includes at least one retractor mechanism for exerting an adjustable force on the wheelchair in a first direction along the vehicle axis, and the front wheel attachment assembly includes at least one retractor mechanism for exerting an adjustable force on the wheelchair in a second direction opposite to the first direction so that the wheelchair is secured between the barrier and bulkhead by the rear and front wheelchair attachment assemblies.

Advantageously, the system includes a coupling having a rear connector, and the first and second attachment elements of the rear wheelchair attachment assembly are affixed to the coupling. The retracting mechanism of the rear wheelchair attachment assembly is connected to the rear connector of the coupling. Preferably, the rear wheelchair retractor mechanism includes a rear retractable belt having a retracted and withdrawn configuration, a release for releasing the belt from the retracted and withdrawn configurations, and a crank for manually tightening the belt when tensioned in the withdrawn configuration. The attachment elements of the rear wheelchair attachment assembly include a first rear attachment belt for attachment to a first rear location of the wheelchair and a second rear belt for attachment to a second rear location of the wheelchair spaced from the first location, and the coupling couples the first and second belts to the rear retractable belt. Preferably, the coupling comprises a plate having a center attachment for attachment to the rear retracting belt, and the first and second rear attachment belts being affixed to the plate at locations spaced equal distances from the center attachment.

Advantageously, the front wheel attachment assembly comprising a first front attachment belt for attachment to a first front location of the wheelchair, a second front attachment belt for attachment to a second front location of the wheelchair spaced from the first front location. A first and a second retractor mechanism is provided for retracting the respective first and second belts in a direction to place a tensioning force on the first and second front belts, and the retractor mechanisms include a manual crank for tightening the tensioned first and second belts. The first and second rear attachment belts diverge outwardly from the respective first and second wheelchair locations toward the anchor locations on the bulkhead to effectively prevent lateral tipping. Preferably, the first and second front attachment belts are also inclined downward from the wheelchair to the front bulkhead. The attachment belts diverge outwardly at an angle in a range of about 0 to 15 degrees with respect to the vehicle longitudinal axis, the preferred value being an angle of about 5 degrees with respect to the vehicle longitudinal axis for a standard wheelchair having a 20" wheel spacing.

In an advantageous aspect of the invention, the front bulkhead includes an extendable anchor member which extends transverse relative to the longitudinal vehicle axis, the anchor member is extendable between a stored position in which the anchor member is stowed with the bulkhead and a deployed position wherein the anchor member is extended from the bulkhead. A first retractor mechanism is carried by the extendable anchor member, and a second retractor mechanism carried by the bulkhead. Preferably, the bulkhead comprises a bulkhead housing, and the anchor member is placed entirely within the bulkhead housing in the stored position. The bulkhead housing includes an opening, and the extendable anchor member moves through the opening when moving between the stored and extended positions. A movable closure is provided for closing the opening of the bulkhead, and the closure forms a track for guiding movement of the anchor member between the stored and extended positions when the closure is open.

The personal securement strap assembly comprises a lap belt affixed near the rear barrier, and a shoulder belt attachable to the lap belt. An adjustable ring tether supports the shoulder belt wherein the ring tether is adjustable to adjust an upper position of the shoulder belt in a vertical direction to accommodate wheelchair occupants of different heights.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
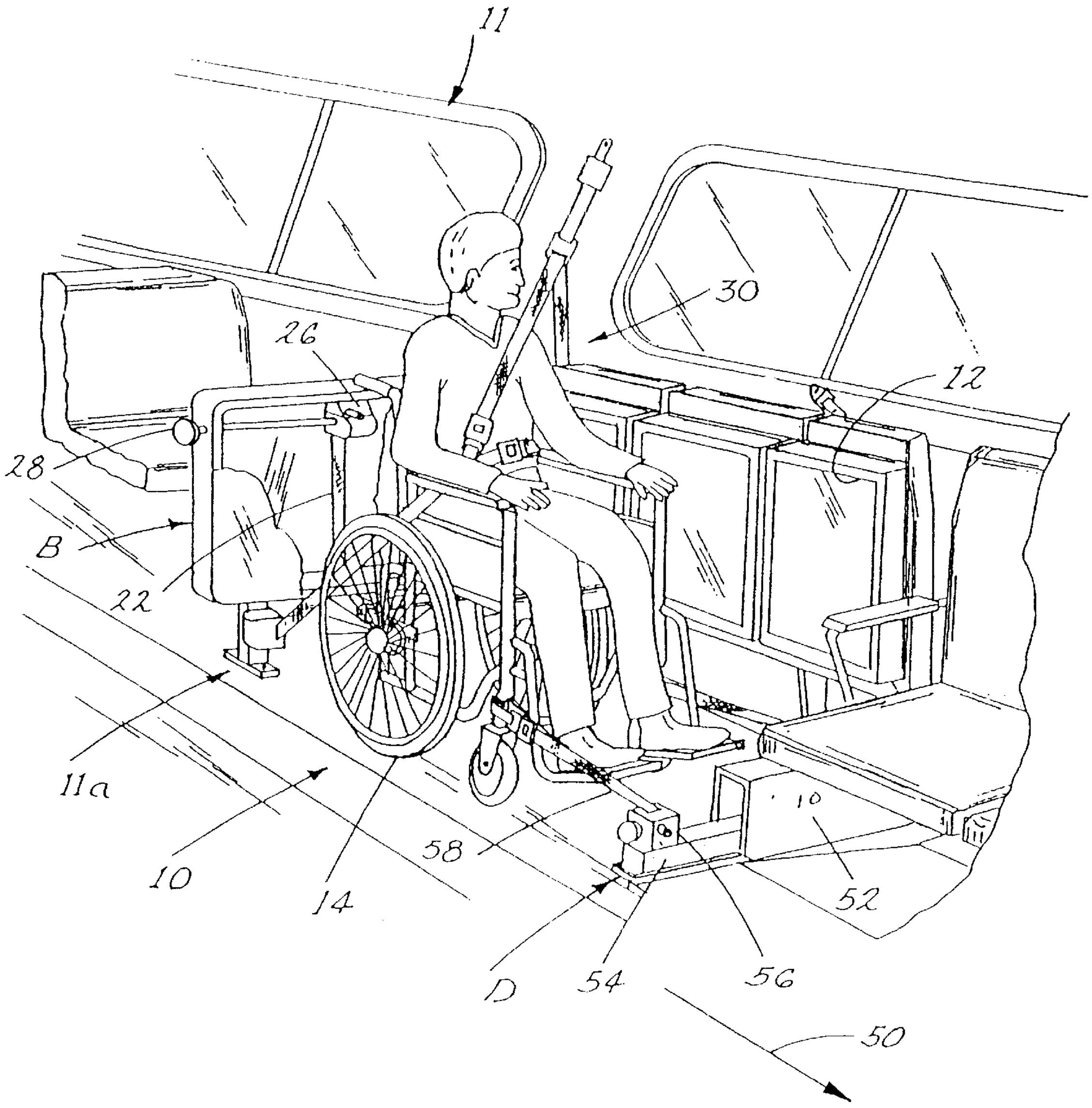
FIG. 1 is a prospective view illustrating a three-point wheelchair restraint system in accordance with the present invention securing a wheelchair and occupant.

Referring now to the drawings, the invention will be described in more detail.

Figure 2:
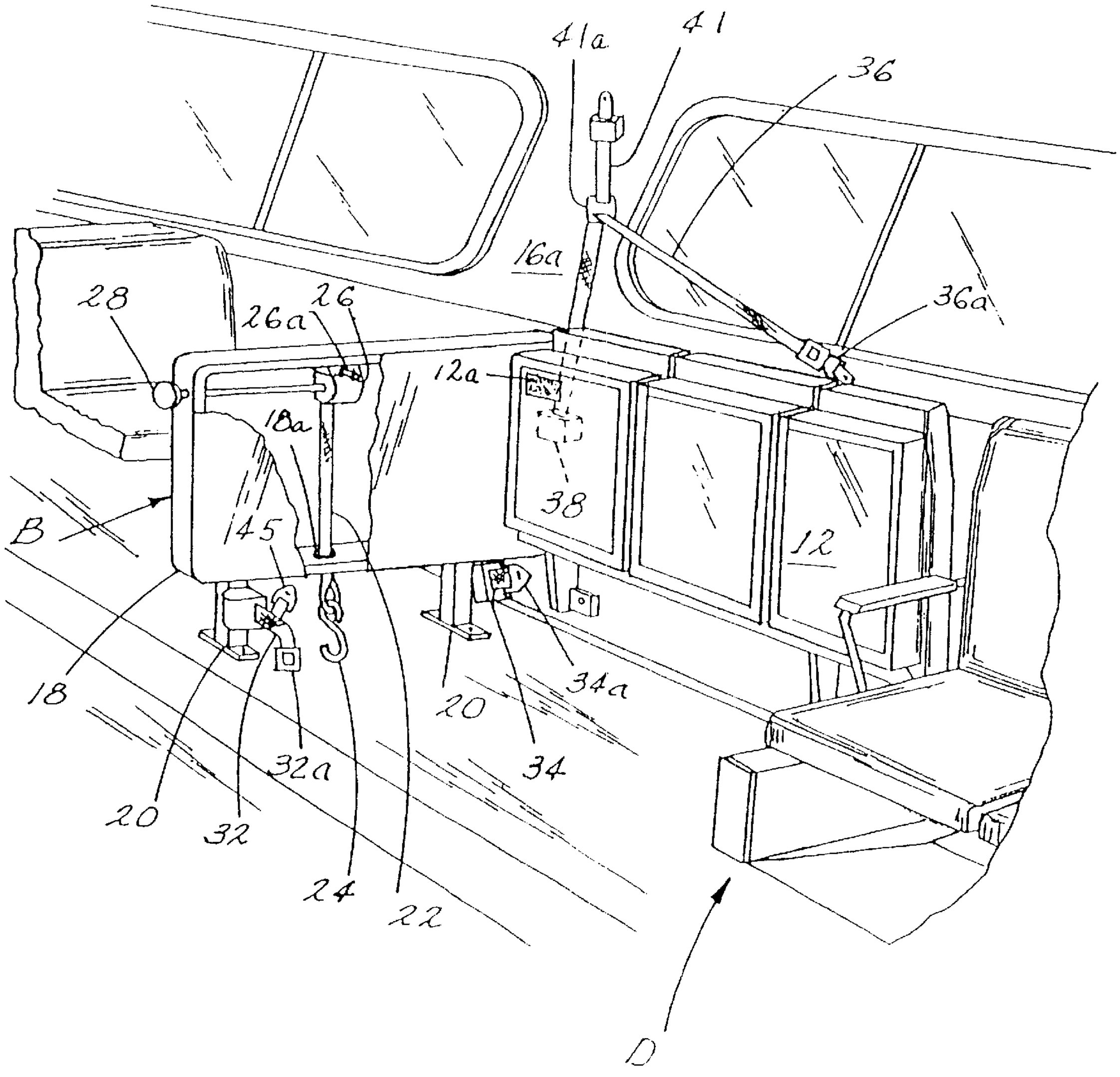
FIG. 2 is a prospective view of FIG. 1 with the wheelchair and occupant removed.

As can best be seen in FIG. 1, a securement area of a mass transportation vehicle is illustrated, generally at 10, which includes an area for seating of regular passengers or a wheelchair passenger. For this purpose, at least one flip seat 12 is provided which may be positioned between a horizontal seating and a flipped position as shown in FIG. 2. A wheelchair 14 may be secured in the securement area with seat 12 in the flipped position as can best be seen in FIG. 1. The securement area includes a rear barrier, designated generally as B, which includes a housing 18 supported on legs 20 bolted to the floor 11*a* of vehicle 11. A retractable belt 22 is housed within the barrier housing 18 and extends through a slot 18*a* terminating in an end to which a hook 24 is secured. A belt/crank retracting mechanism 26 applies a retracting force to belt 22 and a manual crank 28 is provided for tightening a retracted belt, as will be more fully explained hereinafter. A release button 26*a* allows belt 22 to assume a retracted or withdrawn configuration in a conventional manner.

The personal securement belt assembly, designated generally as 30, is provided by a first retractable lap belt 32 and a second retractable lap belt 34 which may be pulled under tension and fastened about the wheelchair occupant. The personal belt assembly is completed by a shoulder belt 36 having a retracting mechanism 38, and an adjustable tether strap 41 having a ring 41*a* fastened to the shoulder belt. The shoulder belt includes a female fastener 36*a* which fastens into a male fastener 45 carried on lap belt 32. A female fastener 32*a* is carried on seat belt 32 which locks with a male fastener 34*a* on seat belt 34. Thus with the lap belt fastened about the wheelchair occupant, the shoulder belt 36 may be fastened to the lap belt for personal securement. When not in use, shoulder belt 36 may be secured by suitable means to a wall 16*a* of the vehicle. In use, lap belt 34 may be temporarily affixed at 12*a* to the underside of flip seat 12 by suitable means such as velcro as a wheelchair is being secured.

Figure 3:
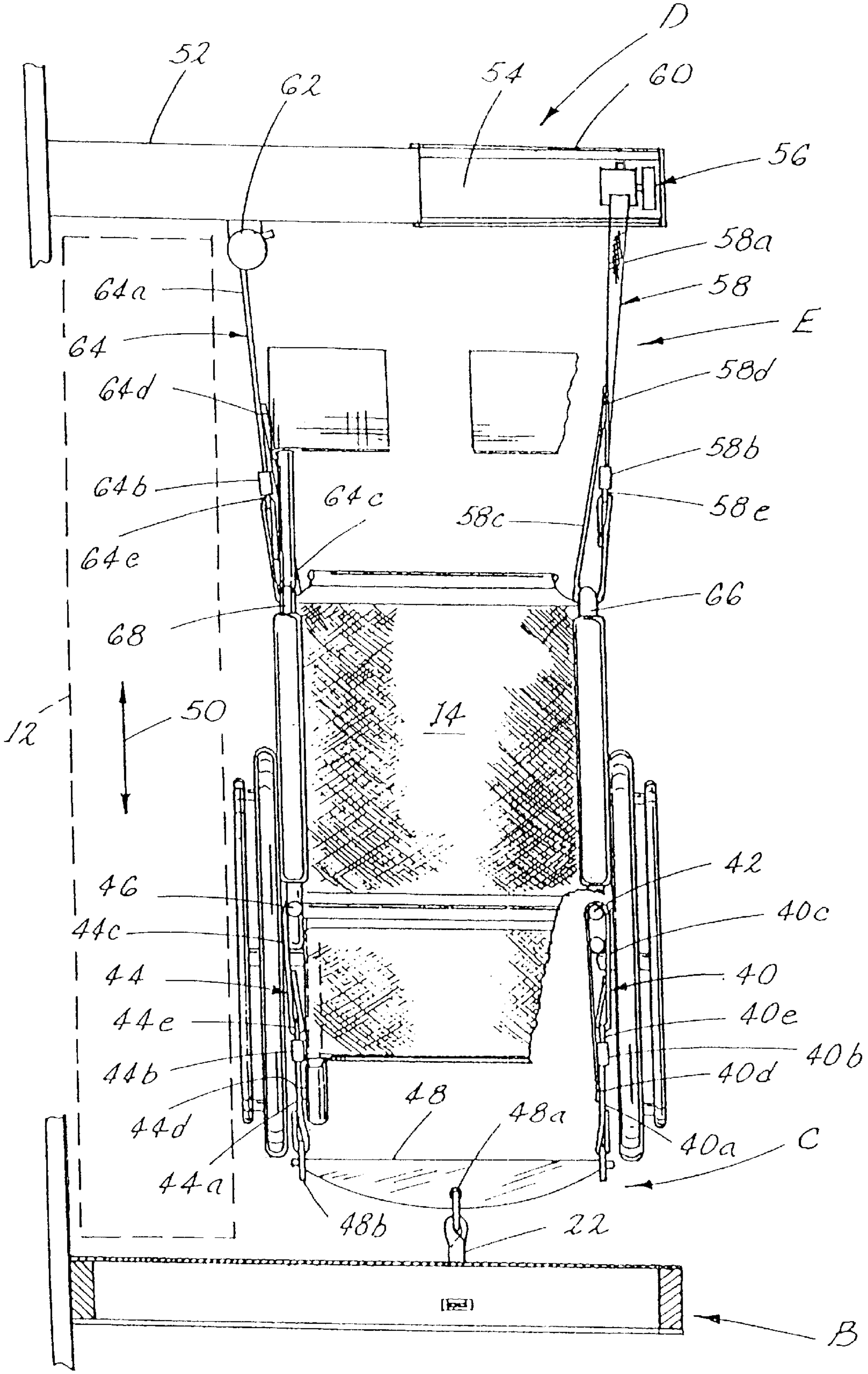
FIG. 3 is a top plan view of a three-point wheelchair restraint system securing a wheelchair in accordance with the present invention.
Figure 4:
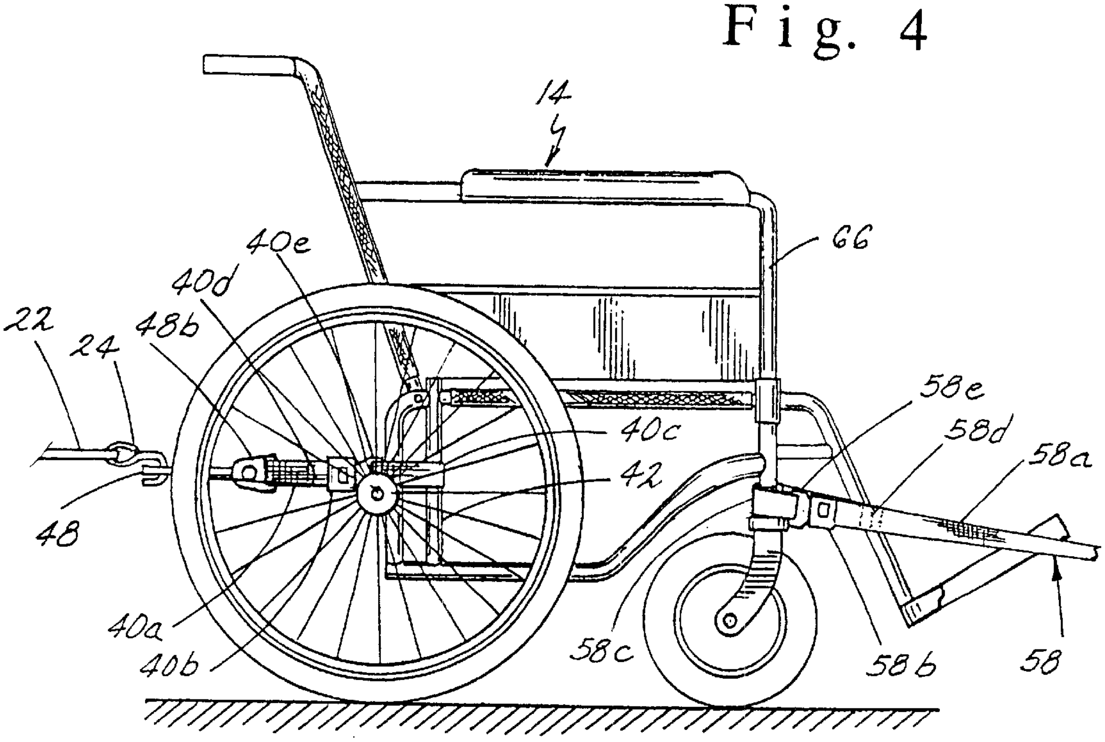
FIG. 4 is a side elevation of a three-point wheelchair restraint system according to the present invention.
Figure 5:
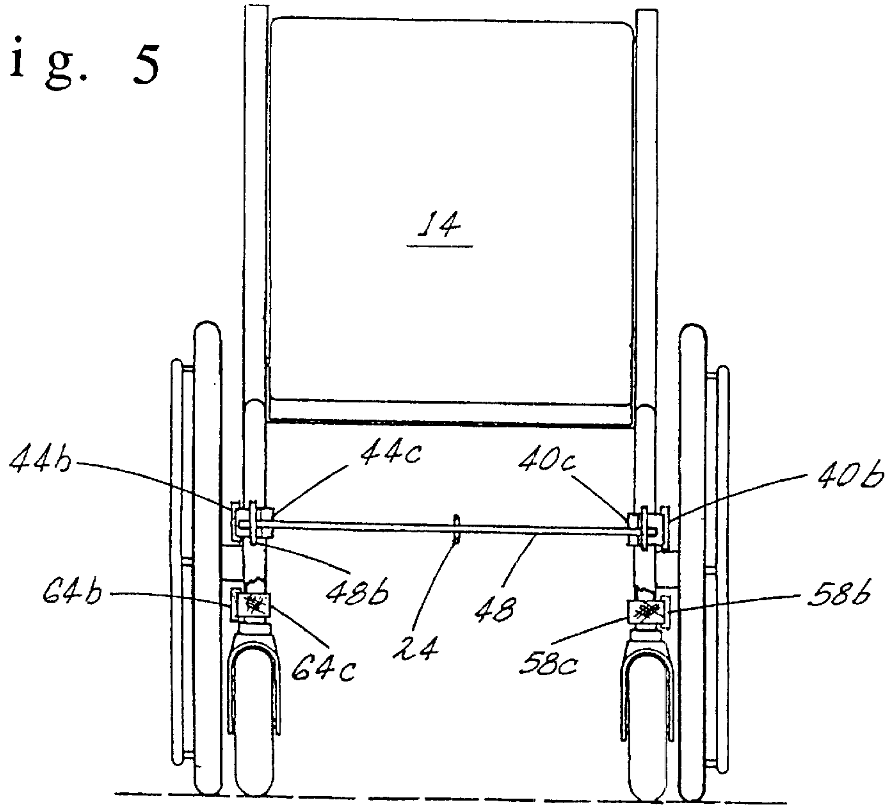
FIG. 5 is a rear view of a three-point wheelchair restraint system according to the present invention.

A rear wheelchair attachment assembly, designated generally as C, is provided for attaching the rear of wheelchair 14 to barrier B, as can best be seen in FIG. 3. Front wheelchair attachment assembly D includes a first rear attachment belt 40 attached to a first rear location 42 of the wheelchair and a second attachment belt 44 attached to a second spaced location 46 of the wheelchair. Locations 42 and 46 are illustrated as vertical frame legs of the wheelchair but may be any other suitable portion. A coupling 48 is provided in the form of a single-tree connector for affixing belts 44 and 42 to retractable belt 22 for tensioning to complete the rear wheelchair attachment assembly. Belt 40 includes a first strap 40*a* affixed to the single-tree coupling at 48*b* which carries a female buckle 40*b*; and a second strap 40*c* affixed at 40*d* to strap 40 which wraps around frame 42 and has a male buckle 40*e* mating with female buckle member 40*b*. Likewise, strap 44 includes a first belt 44*a* affixed to single-tree coupling 48 at 48*b* having a female buckle member 44*b*; and a second strap 44*c* affixed at 44*d* to strap 44*a* which wraps around frame 46 and includes a male buckle 44*e* which fastens with female buckle member 44*b*. Retractable belt 22 may be withdrawn by actuating release button 26*a* of the retracting mechanism 26 and fastened to the single-tree coupling. Once the single-tree coupling is fastened to the wheelchair, the button may be depressed again whereupon belt 22 is retracted under the spring force of retracting mechanism 26. The entire rear wheelchair attachment assembly may then be tightened by manually turning hand crank 28 and tensioning belts 22, 40, and 44.

Figure 6:
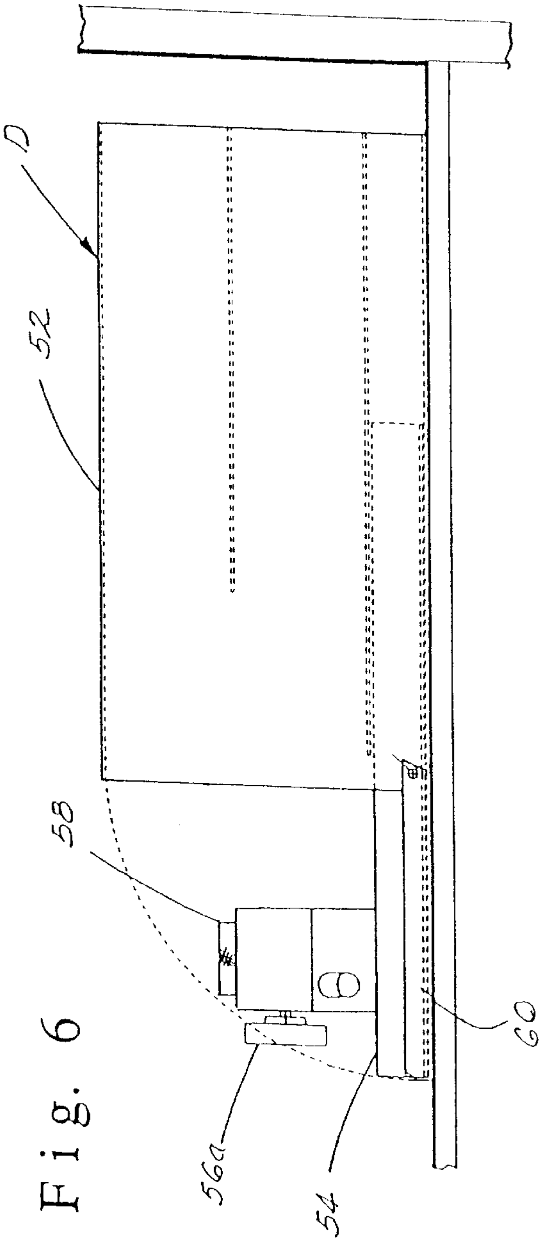
FIG. 6 is a top plan view of a front bulkhead with a slidable anchor member shown in a deployed position.
Figure 7:
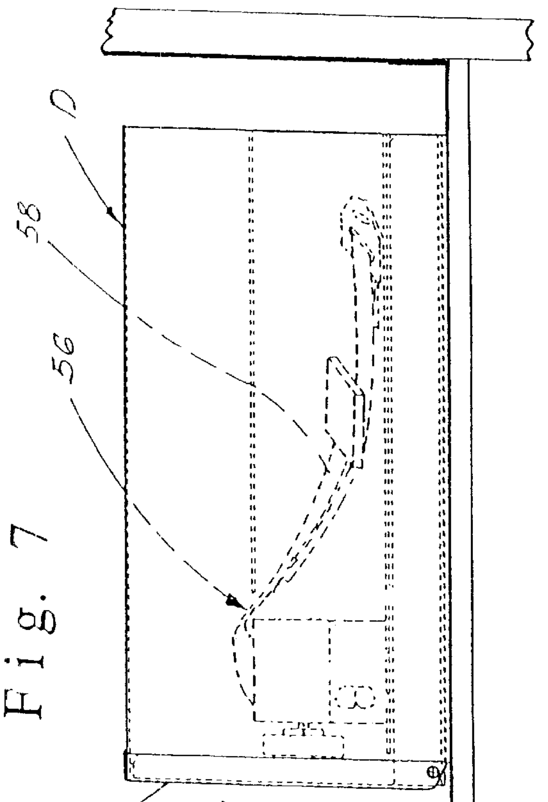
FIG. 7 is a top plan view of the front bulkhead of FIG. 6 with the slidable anchor in a stored position.
Figure 7A:
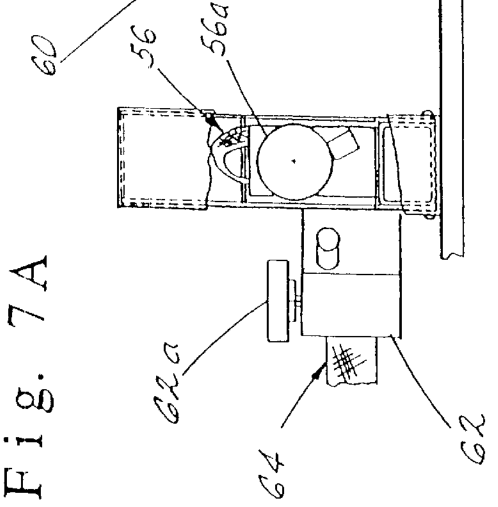
FIG. 7A is a front view with part cut away of FIG. 7.

A front anchor bulkhead, designated generally as D, is carried near a front portion of the securement area for securing the front of the wheelchair. There is a front wheelchair attachment assembly, designated generally as E, for attaching the wheelchair to the front bulkhead. It will be noted at this point, that barrier B and front anchor bulkhead D extend away from side wall 16*a* of the vehicle transversely to a longitudinal axis 50 of vehicle 11. As can best be seen in FIGS. 1, 3, and 6–7A, front anchor bulkhead D includes a housing 52 with suitable reinforcement in which a slidable anchor 54 is enclosed and stored. Slidable anchor 54 has a deployed position (FIG. 6) and a stored position (FIG. 7). In the stored position, a retractable crank/belt assembly, designated generally as 56, is stowed away. In the deployed position of FIG. 6, the belt/crank assembly 56 includes a retractable attachment belt 58 which is anchored to the wheelchair, as can best be seen in FIG. 1. When the belt/crank assembly is stowed, it can be seen that the anchor 54 and belt/crank assembly 56 are stored away clearly out of a position in which a regular passenger may trip over the structure. A closure door 60 is provided for housing 52 which may be closed when the slide anchor and belt mechanism are stowed (FIGS. 2 and 7). Coupling plate 48 and associated belts, and the front belts may also be stored and readily deployed from bulkhead housing 52. The door also provides a track for the slide anchor when being deployed (FIGS. 1 and 6). There is a second crank/belt mechanism 62 carried by bulwark housing 52 wherein the crank/belt mechanism includes a retractable attachment belt 64 for securing to a second front location of the wheelchair. Again, as can best be seen in FIG. 3, front belt 58 includes a first strap 58*a* having a female buckle 58*b* and a second strap 58*c* secured as one piece to strap 58*a* at a stitching point 58*d*. Second strap 58*c* encircles a frame portion 66 of the wheelchair and includes a male buckle element 58*e* which fastens with female buckle 58*b*. Likewise, front belt 64 includes a first strap 64*a* having a female buckle 64*b* and a second strap 64*c* stitched to first strap 64*a* at 64*d*. Second strap 64*c* includes a male buckle element 64*e* which fastens into female buckle 64*b* after being wrapped around wheelchair frame 68. It will be emphasized in relation to FIG. 3 that belts 58 and 64 diverge outwardly from their attachment location at the front of wheelchair 14 toward the respective crank/belt mechanisms 56 and 62. It has been found according to the invention, that the divergences of these belts effectively prevents tipping of the wheelchair with an occupant when the wheelchair is secured between the rear barrier and front anchor. Likewise, it will be noted that front belts 58 and 64 are inclined downwardly from wheelchair 14 to anchor locations at 56 and 62. This has also been found advantageous to securing the wheelchair and occupant. The angle between the attachment belts and the vehicle axis may vary depending upon the wheelchair's width and size. For example, it has been found that the anchor line of belt 58 will vary from 0 to 15 degrees with respect to the vehicle axis as will the anchor line of belt 64. However, in a limited number of wide wheelchair applications, the anchor line of belt 58 may converge with respect to anchor location 56 so that the range for belt 58 may be from −0 to −15 degrees in the case of wide wheelchair applications. However, since it is desired that the wheelchair be kept as close as possible to the underside of flip seat 12, belt 64 next to the flip seat will normally not undergo a negative angle but will always vary between 0 and 15 degrees with respect to the vehicle axis. While wheelchairs vary greatly in their sizes and configuration, for a standard manual wheelchair having a 20" lateral wheel spacing the preferred angle has been found to be approximately 5 degrees for belt 64 and 5 degrees for belt 58.

Any suitable retracting mechanisms or operator devices may be utilized at 26, 56 and 62. Suitable retractors and belt assemblies are available from Indiana Mills Corporation of Indianapolis, Ind. Belt 22 and retractor 26 may be a suitable crank/belt mechanism assembly available as no. 55080089. The front retractors 56 and 62 may each be a crank/belt assembly no. 55080091. The personal securement belt assembly may be a suitable three-point seat belt, lap belt and retractor, available as no. 55080048. While rear wheelchair attachment assembly C is illustrated as including a single retractable belt, two retractable belts may be used connected directly to the side frames of the wheelchair without a coupling plate. Also, manual retractor cranks, but with automatic retractors, may not be needed at both the front and rear assemblies, but be needed only at one to secure the wheel-chair there between.

In use, when a wheelchair passenger is to be carried on the vehicle, the driver/operator will raise flip seat 12 and lock it in the up position. The driver/operator will then withdraw the wall side lap belt 34, and pull out the belt and attach it to the underside of flip seat 12 by means of velcro 12*a*. The driver/operator will then position the wheelchair in the securement area and attach the rear wheelchair attachment assembly C to the wheelchair. The driver/operator then presses release button 26*a* on the rear wheelchair crank/belt mechanism 26 and pull enough webbing 22 out to attach to the coupling plate 48. The driver/operator will then move the wheelchair as close as possible to the rear barrier and press the release button once again to eliminate any loose belting from rear belt 22. The driver/operator will then attach the front wheelchair attachment assembly E to the wheelchair by withdrawing the attachment belt 64 closest to the wall, press the release button and pull out enough belting to attach to the front member of the wheelchair. The release button will then be pressed again to eliminate any loose webbing and the tension of the belt may be tightened by turning the crank 62*a* of retracting mechanism 62. Next the slide anchor 54 is extended from the bulkhead and attachment belt 58 is withdrawn and attached to the wheelchair whereupon the release button is pressed to pull out any loose webbing and the belt tightened by manual crank 56*a*. Final tension can then be applied to the system by turning the crank 28 at the rear barrier. The passenger lap belt is then fastened by removing the wall side belt from the velcro attachment and unreeling both lap belts and locking at the waist. Shoulder belt 36 is then removed from the wall and attached to the lap belt. This belt is an inertia belt that allows body movement. The lap belt does not tighten to an uncomfortable position because the wheelchair attachment belts have already been installed in place first.

Thus, it can be seen that a highly effective three-point restraint system for a wheelchair and occupant can be had according to the invention wherein a three-point anchoring of the wheelchair is achieved by anchor belts 22, 58, and 64. This three-point restraint system provides effective securement of the wheelchair to restrain the wheelchair against tipping laterally or turning over rearwardly and forwardly during vehicle movement. The system minimizes the amount of belts needed to secure a wheelchair occupant, and eliminates floor tracks and floor pockets.

While a preferred embodiment of the invention has been described using specific terms, such description is for illustrative purposes only, and it is to be understood that changes and variations may be made without departing from the spirit or scope of the following claims.

What is claimed is:

1. In a mass transit vehicle having a vehicle axis, a floor, sidewalls, a plurality of seats, a wheelchair securement area, and front and rear attachment assemblies for securing a wheelchair in said wheelchair securement area, the method of positioning the front attachment assembly between a stowed position and a deployed position comprising:

providing a stationary member;

providing a first crank belt mechanism and maintaining said crank belt mechanism in a stationary position adjacent said stationary member;

providing a second crank belt mechanism;

providing a slidable anchor and mounting said second crank belt mechanism with said slidable anchor;

slidably mounting said slidable anchor and said second crank belt mechanism with said stationary member;

moving said slidable anchor and said second crank belt mechanism relative to said stationary member toward and transversely of said axis into an operating position extended from said stationary member; and, moving said slidable anchor and said second crank belt mechanism relative to said stationary member away from and transversely of said axis into a non-operating position.

2. The method of claim 1 including the step of providing said stationary member with a door and moving said door into a closed position enclosing said slidable anchor within said stationary member when in said non-operating position.

3. The method of claim 1 including the step of providing said stationary member with a door, positioning said door in an open position in order to move said anchor over said door into said operating position.

4. The method of claim 1 including the step of providing a seat adjacent said securement area and moving said seat between a seating position substantially covering said securement area when no wheelchair is present and a flipped position clearing said securement area when a wheelchair is present.

5. A method for attaching a wheelchair to a vehicle comprising:

providing a vehicle having a vehicle axis with an area of a floor of the vehicle for receiving a wheelchair;

providing said vehicle with front and rear attachment assemblies for anchoring said wheelchair within said area and providing said front and rear attachment assemblies with first and second belt crank mechanisms respectively, each belt crank mechanism having an adjustable belt for securing with said wheelchair at predetermined spaced locations for anchoring said wheelchair in said area;

providing a slide anchor slidable over said vehicle floor in reciprocating movement transverse to said vehicle axis;

positioning said first belt crank mechanism of said front attachment assembly in a stationary position relative one end of said slide anchor for engaging said wheelchair at a first location in said area;

providing said slide anchor with said second belt crank mechanism of said front attachment assembly for engaging a second location of said wheelchair in said area, said slide anchor being movable relative to said vehicle between an operating position in which said adjustable belt of said second belt crank mechanism is engaged with said wheelchair at said second location and a non-operating position in which said adjustable belt of said second belt crank mechanism is detached and withdrawn from said wheelchair;

placing a wheelchair in said area;

sliding said anchor from said non-operating position to said operating position; and attaching said front and rear attachment assemblies with said wheelchair securing said wheelchair in said area.

6. The method of claim 5 including the step of providing a stationary member with said front attaching assembly;

securing said stationary member in stationary position transverse to said axis;

moving said slidable anchor into said stationary member during movement into said non-operating position; and, moving said anchor out of said stationary member during movement into said operating position.

7. The method of claim 5 including the step of providing a stationary barrier for supporting said rear attachment assembly and mounting said rear attachment assembly with said barrier.

* * * * *